United States Patent
Luo et al.

(10) Patent No.: US 11,870,281 B2
(45) Date of Patent: Jan. 9, 2024

(54) VOLTAGE BALANCING SYSTEM

(71) Applicant: Globe (Jiangsu) Co., Ltd, Jiangsu (CN)

(72) Inventors: Ming Luo, Jiangsu (CN); Chuanjun Liu, Jiangsu (CN); Xian Zhuang, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 158 days.

(21) Appl. No.: 17/128,164

(22) Filed: Dec. 20, 2020

(65) Prior Publication Data

US 2021/0203170 A1 Jul. 1, 2021

(30) Foreign Application Priority Data

Dec. 31, 2019 (CN) .......................... 201911404319.X

(51) Int. Cl.
  *H02J 7/00* (2006.01)
  *H02J 1/10* (2006.01)
(52) U.S. Cl.
  CPC ............ *H02J 7/0016* (2013.01); *H02J 1/106* (2020.01); *H02J 7/0019* (2013.01)
(58) Field of Classification Search
  CPC ........ H02J 1/106; H02J 7/0014; H02J 7/0019; H02J 7/0016; H02J 7/0013
  See application file for complete search history.

(56) References Cited

U.S. PATENT DOCUMENTS

| 9,647,463 | B2 | 5/2017 | Brandl et al. |
| 10,418,825 | B2 | 9/2019 | Cheng et al. |
| 10,790,545 | B2 * | 9/2020 | Wigney ............... H01M 10/425 |
| 2008/0012529 | A1 * | 1/2008 | Chang .................. H02J 7/0016 320/116 |

(Continued)

FOREIGN PATENT DOCUMENTS

| CN | 106340923 A | 1/2017 |
| CN | 107482728 A | 12/2017 |

(Continued)

OTHER PUBLICATIONS

Extended European Search Report of counterpart European Patent Application No. 20214679.1 dated May 12, 2021.

*Primary Examiner* — Richard Isla
*Assistant Examiner* — Sadia Kousar

(57) ABSTRACT

The invention provides a voltage balancing system for balancing controlling of voltage of battery cells including a first set of battery cells and a second set of battery cells connected in series. The system includes a high-side analog front end (AFE) connected to the first set of battery cells, a low-side analog front end (AFE) connected to the second set of battery cells, a microcontroller communicating with the high-side AFE and the low-side AFE, and a communication isolating module interconnecting between the high-side AFE and the microcontroller. The system further includes a balancing module arranged at a back end of the low-side AFE or the high-side AFE to equalize voltages output by the low-side AFE and the high-side AFE. Compared with the prior arts, the system employs a balancing module to balance the voltages of the two sets of battery cells, which can shorten the voltage difference therebetween.

3 Claims, 4 Drawing Sheets

(56) References Cited

U.S. PATENT DOCUMENTS

| | | | |
|---|---|---|---|
| 2009/0039830 A1 | 2/2009 | Pellenc | |
| 2012/0179399 A1* | 7/2012 | Yun | H01M 10/441 |
| | | | 702/63 |
| 2012/0293125 A1 | 11/2012 | Suzuki | |
| 2013/0113280 A1* | 5/2013 | Yang | H02J 7/0016 |
| | | | 307/19 |
| 2013/0241480 A1 | 9/2013 | Kirimoto et al. | |
| 2015/0130469 A1* | 5/2015 | Bolduc | G01R 31/66 |
| | | | 324/426 |

FOREIGN PATENT DOCUMENTS

| | | |
|---|---|---|
| CN | 108702011 A | 10/2018 |
| CN | 109245211 A | 1/2019 |
| CN | 109755996 A | 5/2019 |
| CN | 110148987 A | 8/2019 |
| CN | 110471003 A | 11/2019 |
| EP | 2475064 A2 | 7/2012 |

\* cited by examiner

VOLTAGE BALANCING SYSTEM

CROSS-REFERENCE TO RELATED INVENTIONS

This invention claims the priority of CN application Ser. No. 201911404319.X, filed on Dec. 31, 2019, the disclosures of which are hereby incorporated by reference in their entirety.

TECHNICAL FIELD

The present invention relates to a voltage balancing system, which belongs to a field of battery management.

BACKGROUND ART

In current battery pack industry, in order to achieve high voltage, multiple battery cells are usually connected in series, but the number of battery cells managed by the analog front end (AFE) is limited, so two or more AFEs are used to manage them separately. When two independent AFEs are employed to monitor the battery cells, a high-end AFE needs to use an isolation chip to communicate with the MCU because of a potential difference compared with the MCU.

As shown in FIG. 1, at present, a common isolation chip on the market requires two independent isolated power supplies (VCC1, VCC2) to supply power to the isolation chip, the two independent power supplies are provided by two analog front ends (U1, U2), respectively. Because the power consumption of the isolated power supply VCC1 and VCC2 is not consistent, this causes the voltage of BAT1 to BAT(n) and BAT (n1) to BAT (2n) to gradually differ after a period of use of the entire battery pack, which is very unfavorable for the recycling of the entire battery pack.

In view of the above, there is a need to provide a voltage balancing system for balancing a voltage difference between two sets of battery cells.

SUMMARY OF INVENTION

Present invention provides a voltage balancing system, adapted for balancing controlling of voltage of battery cells. The battery cells include at least a first set of battery cells and a second set of battery cells connected in series, comprising a high-side analog front end connected to the first set of battery cells, a low-side analog front end connected to the second set of battery cells, a microcontroller communicating with the high-side analog front end and the low-side analog front end, and a communication isolating module connected between the high-side analog front end and the microcontroller. The voltage balancing system further comprises a balancing module arranged at a back end of the low-side analog front end or the high-side analog front end to equalize voltages output by the low-side analog front end and the high-side analog front end.

As a further improvement of the invention, the voltage output by the high-side analog front end is defined as a first voltage, and the voltage output by the low-side analog front end is defined as a second voltage, and wherein the balancing module is a constant value balancing resistor connecting with the high-side analog front end or the low-side analog front end when a voltage difference between the first voltage and the second voltage is a constant value.

As a further improvement of the invention, a working current of the high-side analog front end is defined as a first current and a working current of the low-side analog front end is defined as a second current, and the first current and the second current remain unchanged within normal working voltage range of corresponding analog front end, and wherein when the second current is greater than the first current, the constant value balancing resistor is connected to the low-side analog front end; when the first current is greater than the second current, the constant value balancing resistor is connected to the high-side analog front end.

As a further improvement of the invention, when the second current is greater than the first current, a resistance R of the constant value balancing resistor is equal to a ratio of the second voltage to a difference between the second current and the first current; when the first current is greater than the second current, the resistance R of the constant value balancing resistor is equal to a ratio of the first voltage to the difference between the second current and the first current.

As a further improvement of the invention, the voltage output by the high-side analog front end is defined as a first voltage, and the voltage output by the low-side analog front end is defined as a second voltage, and wherein the balancing module connects to the microcontroller and consists of a balancing switch transistor and a balancing resistor when a voltage difference between the first voltage and the second voltage is a non-constant value.

As a further improvement of the invention, the balancing module comprises a first balancing circuit connected to the high-side analog front end and a second balancing circuit connected to the low-side analog front end, the first balancing circuit consists of a first balancing switch transistor and a first balancing resistor connecting with the first balancing switch transistor, and the second balancing circuit consists of a second balancing switch transistor and a second balancing resistor connecting with the second balancing switch transistor.

As a further improvement of the invention, the first balancing switch transistor is also respectively connected to an output end of the microcontroller and the high-side analog front end, and a switch signal of the first balancing switch transistor is sent by the microcontroller; and wherein the second balancing switch transistor is also respectively connected to an output end of the microcontroller and the low-side analog front end, and a switch signal of the second balancing switch transistor is sent by the microcontroller.

As a further improvement of the invention, the microcontroller collects and compares sums of voltage output by the first set of battery cells and the second set of battery cells, respectively, wherein when a sum of voltage of the first set of battery cells is greater than that of the second set of battery cells, the microcontroller turns on the first balancing switch transistor to start the first balancing circuit; when a sum of voltage of the second set of battery cells is greater than that of the first set of battery cells, the microcontroller turns on the second balancing switch transistor to start the second balancing circuit.

As a further improvement of the invention, the microcontroller turns on the corresponding balancing circuit when voltage difference between the sum of voltage of the first set of battery cells and that of the second set of battery cells is greater than 100 mv and shuts down the corresponding balancing circuit when the voltage difference between the sum of voltage of the first set of battery cells and that of the second set of battery cells is less than 20 mv.

As a further improvement of the invention, further comprising a low dropout regulator connected between the battery cells and the microcontroller.

The above general description and the following detailed description are intended to be illustrative and not restrictive.

DESCRIPTION OF EMBODIMENT

Figure 1:
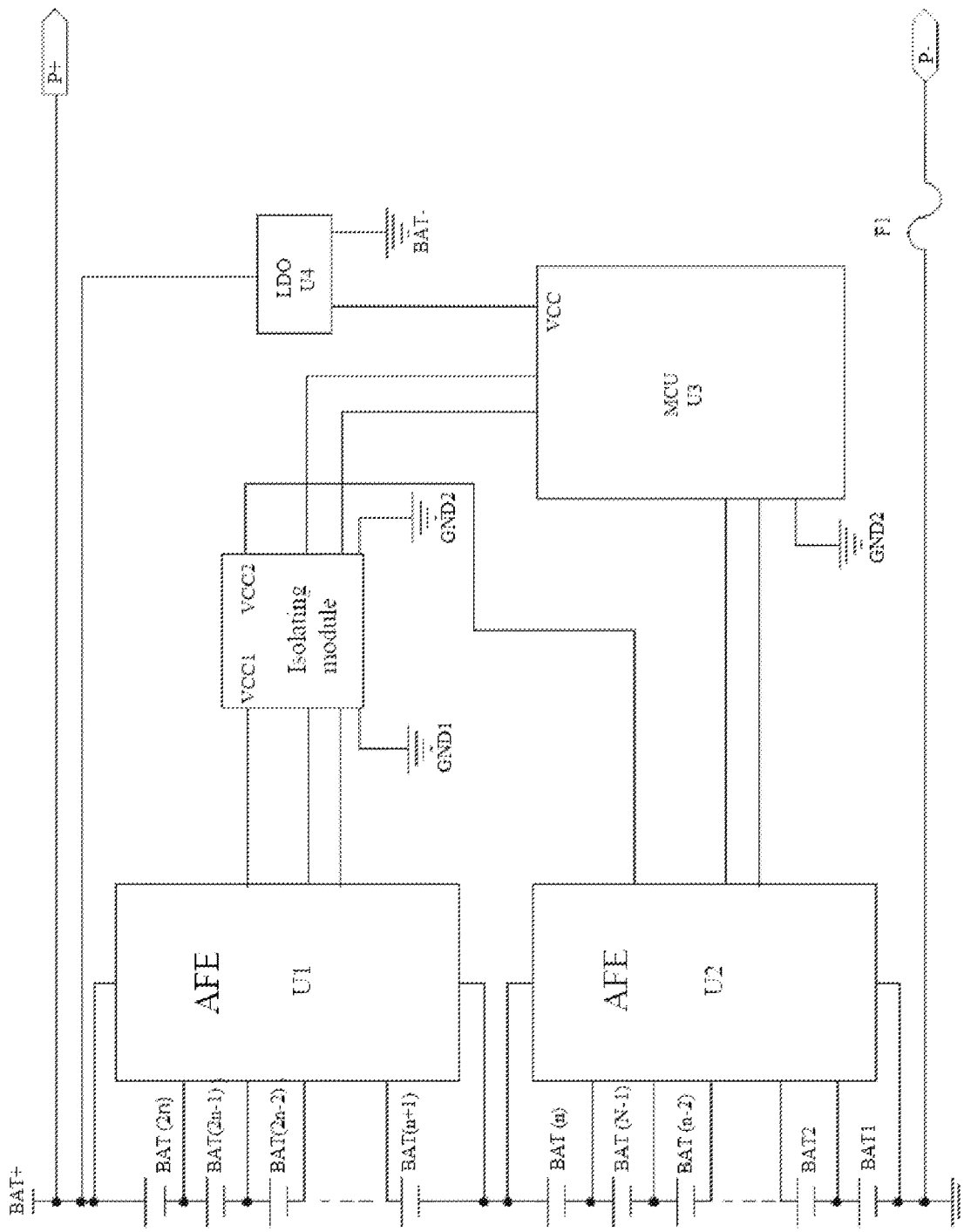
FIG. 1 is a schematic diagram showing a conventional voltage management system of battery cells.

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines, and methods consistent with some aspects of the invention as detailed in the appended claims.

Reference will now be made to the drawing figures to describe the embodiments of the present disclosure in detail. In the following description, the same drawing reference numerals are used for the same elements in different drawings.

The present invention discloses a voltage balancing system, adapted for balancing controlling of voltage of battery cells in a battery pack. For the convenience and clarity of description, the following will take the battery cells including two sets of battery cells as an example for detailed description, but it should not be limited to this.

Figure 2:
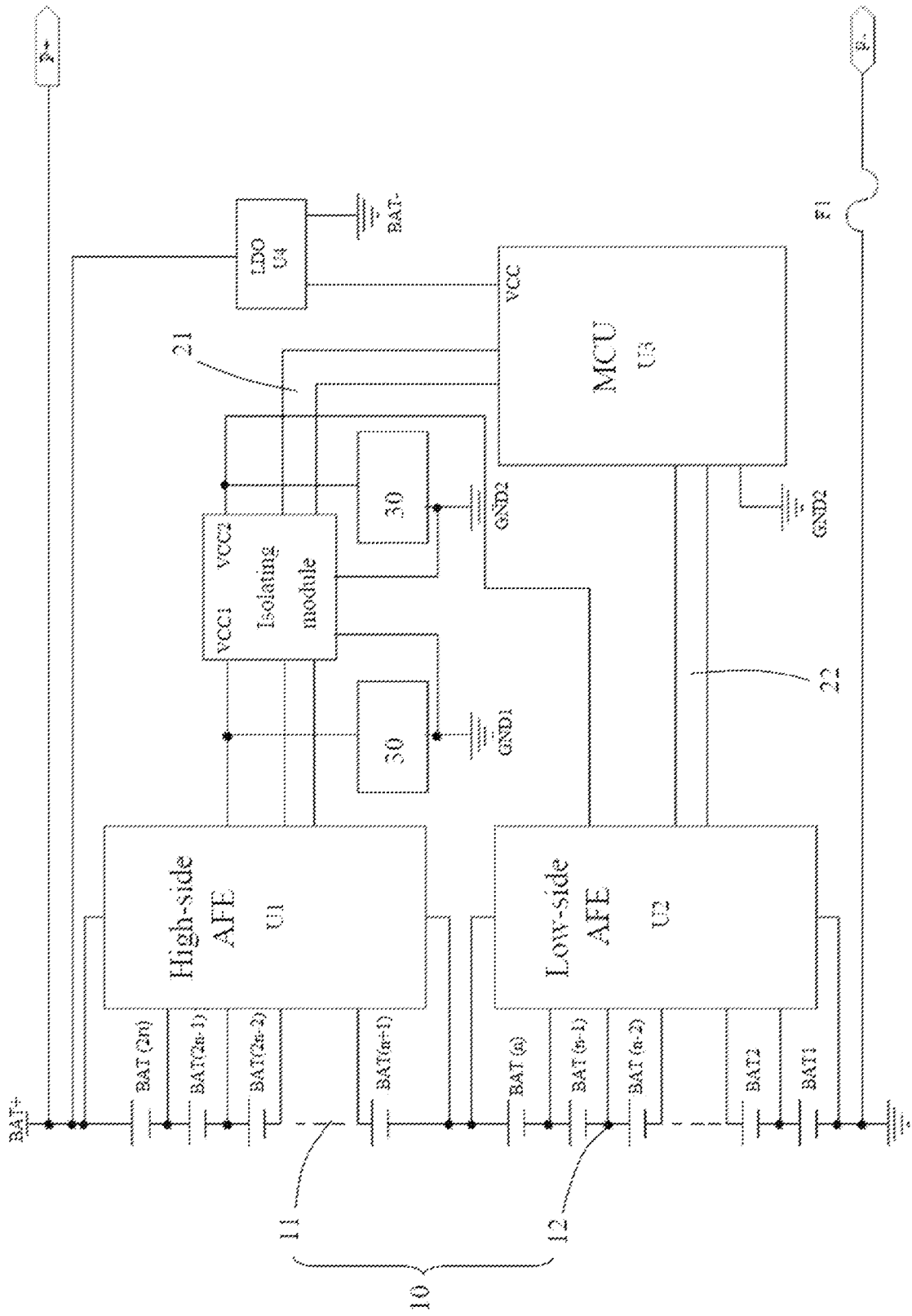
FIG. 2 is a schematic structural diagram of a voltage balancing system in accordance with a first embodiment of the present invention.

As shown in FIG. 2, the voltage balancing system comprises analog front end (AFE), microcontroller (MCU) U3, communication isolating module, low dropout regulator (LDO) U4 and balancing module 30. The LDO U4 connects between the battery cells and the microcontroller U3.

The battery cells 10 is defined to include a first set of battery cells 11 and a second set of battery cells 12, and the first set of battery cells 11 and the second of battery cells 12 connected in series. The analog front end (AFE) is arranged in parallel with the battery cells 10, and comprises a high-side analog front end U1 connected in parallel with the first set of battery cells 11 and a low-side analog front end U2 connected in parallel with the second set of battery cells 12. The high-side analog front end U1 is used to collect the analog voltage output by the first set of battery cells 11 and transmit the collected voltage to the microcontroller U3, and the low-side analog front end U2 is used to collect the analog voltage output by the second set of battery cells 11 and transmit the collected voltage to the microcontroller U3.

Preferably, the low-side analog front end U2 communicates with the microcontroller U3 through a second communication channel 22, so that when the microcontroller U3 needs to collect the analog voltage of any battery in the second set of battery cells 12, the second communication channel 22 may be used for the transmission of instructions, and the low-side analog front end U2 will quickly detect and extract the analog value of the corresponding battery after receiving such instructions. At the same time, the low-side analog front end U2 integrates therein an ADC module, so that after the low-side analog front end U2 detects the analog voltage value of the second set of battery cells 12, it could be directly converted to the digital quantity and sent to the microcontroller U3 through the second communication channel 22.

The high-side analog front end U1 communicates with the microcontroller U3 via the communication isolating module. Specifically, the communication isolating module connects between the high-side analog front end U1 and the microcontroller U3, and connects the communicating interface of the high-side analog front end U1 with the communicating interface of the microcontroller U3, so as to realize the communication between the high-side analog front end U1 and the microcontroller U3. Preferably, the high-side analog front end U1, the communication isolating module and the microcontroller U3 communicates with each other through a first communication channel 21, and the specific communicating process thereof could refer to the communicating process between the low-side analog front end U2 and the microcontroller U3. No detailed description is given here now.

The communication isolating module is powered by two separate isolated power supplies (VCC1, VCC2), and the isolated power supply VCC1 is provided by the high-side analog front end U1, the isolated power supply VCC2 is provided by the low-side analog front end U2. The balancing module 30 is arranged at a back end of the low-side analog front end U2 or the high-side analog front end U1, which is used to balance the voltage difference between the isolated power supply VCC1 and VCC2.

The isolated power supply VCC1 can also be understood as the voltage of the first set of battery cells 11, since the high-side analog front end U1 collects the voltage value of a single battery of the first set of battery cells 11; while the isolated power supply VCC2 can also be understood as the voltage of the second set of battery cells 12, since the low-side analog front end U2 collects the voltage value of a single battery of the second set of battery cells. Therefore, the balancing module 30 can be understood as: be used to balance the voltage of the first set of battery cells 11 and the second set of battery cells 12.

As shown in FIG. 2, it is the first embodiment of the present invention. In this embodiment, the voltage output by the high-side analog front end U1 is defined as a first voltage (ie, the isolated power supply VCC1), and the voltage output by the low-side analog front end U2 is defined as a second voltage (ie, the isolated power supply VCC2). When the voltage difference between the first voltage and the second voltage is a constant value, the balancing module 30 is a constant value balancing resistor R connected to the high-side analog front end U1 or the low-side analog front end U2.

Figure 3:
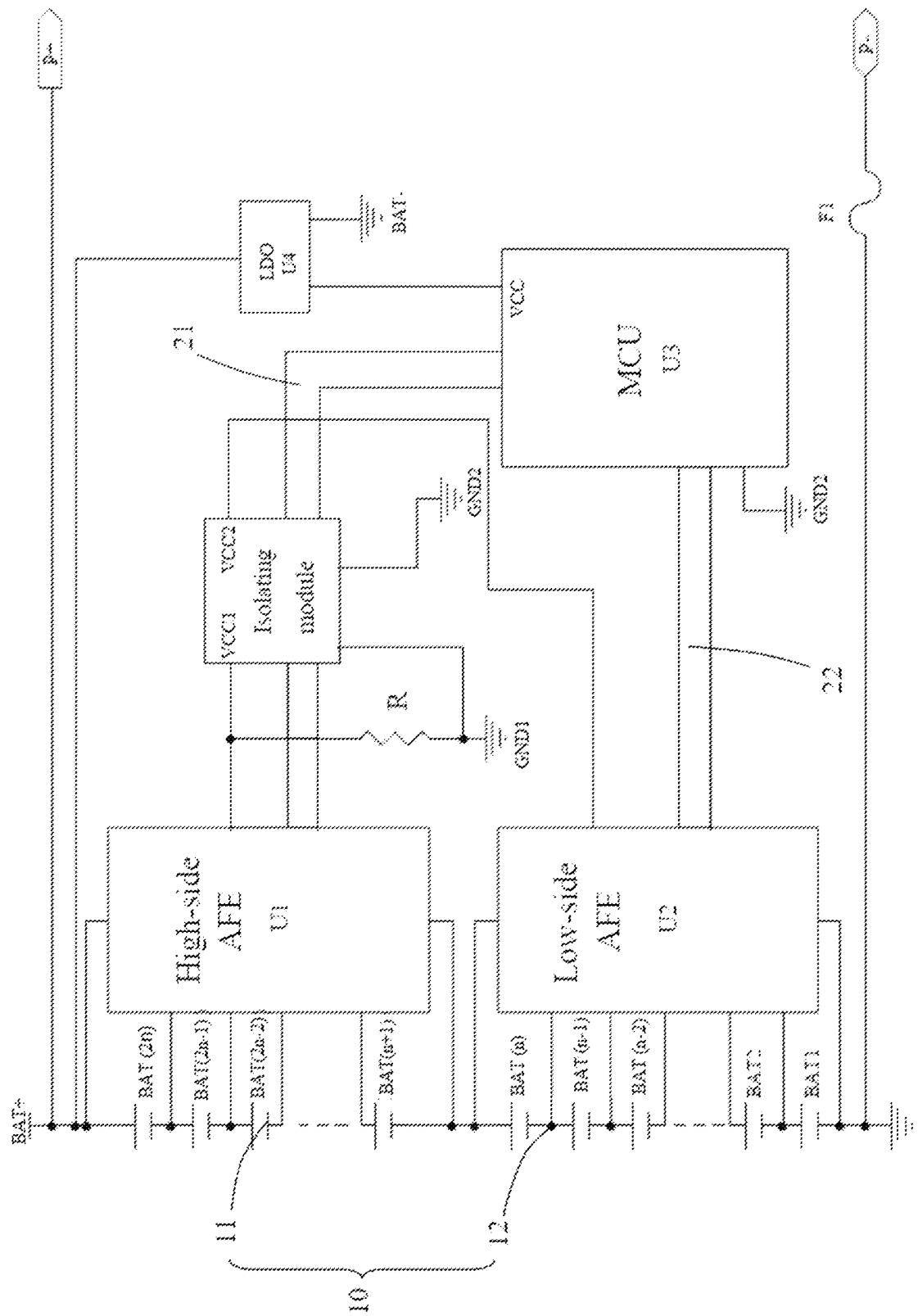
FIG. 3 is a schematic structural diagram of one of the schemes shown in FIG. 1.

As shown in FIG. 3, a working current of the high-side analog front end U1 is defined as a first current I1, a working current of the low-side analog front end U2 is defined as second current I2, and the first current I1 and the second current I2 remain unchanged within the normal working voltage scope of corresponding analog front end. When the second current I2 is greater than the first current I1, the constant value balancing resistor R is connected to the low-side analog front end U2, at this time, the resistance R of the constant value balancing resistor=the second voltage/ (the second current-the first current), ie. VCC2/(I2−I1); while when the first current I1 is greater than the second current I2, the constant value balancing resistor R is connected to the high-side analog front end U1, at this time, the resistance R of the constant value balancing resistor=the first voltage/(the first current-the second current), ie. VCC1/(I1−I2). In this way, a purpose of balancing the operating power consumption of the isolated power supply VCC1 and VCC2 is achieved, so that the voltage of the two sets of battery cells managed by the high-side analog front end U1 and the low-side analog front end U2 are not different.

Figure 4:
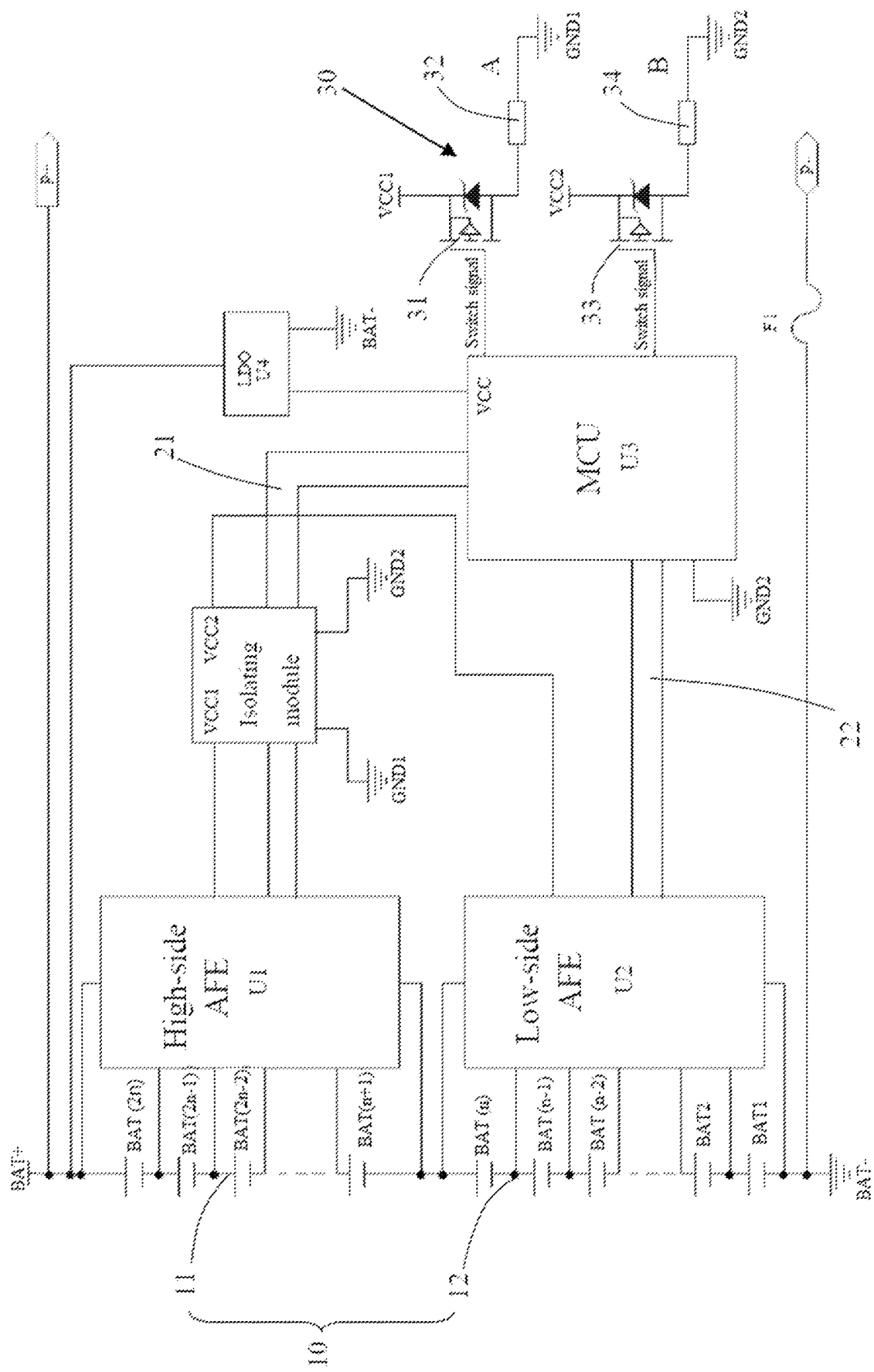
FIG. 4 a schematic structural diagram of a voltage balancing system in accordance with a second embodiment of the present invention.

As shown in FIG. 4, it is the second embodiment of the present invention. In this embodiment, the voltage output by the high-side analog front end U1 is defined as the first voltage (ie. isolating power supply VCC1), the voltage output by the low-side analog front end U2 is defined as the second voltage (ie. isolating power supply VCC 2). When the voltage difference between the first voltage and the second voltage is a non-constant value, the balancing module 30 is connected to the microcontroller 3 and composed by the balancing switch tube and the balancing resistor.

As shown in FIG. 4, it is the second embodiment of the present invention. In this embodiment, the voltage output by the high-side analog front end U1 is defined as the first voltage (i.e. isolating power supply VCC1), the voltage output by the low-side analog front end U2 is defined as the second voltage (i.e. isolating power supply VCC 2). When the voltage difference between the first voltage and the second voltage is a non-constant value, the balancing module 30 is connected to the microcontroller 3 and composed by the balancing switch transistor and the balancing resistor.

Specifically, the balancing module 30 comprises a first balancing circuit A connected with the high-side analog front end U1 and a second balancing circuit B connected with the low-side analog front end U2. The first balancing circuit A is composed by a first balancing switch transistor 31 and a first balancing resistor 32 connected with the first balancing switch transistor 31, and the second balancing circuit B is composed by a second balancing switch transistor 33 and a second balancing resistor 34 connected with the second balancing switch transistor 33.

The first balancing switch transistor 31 also connects to output ends of the microcontroller U3 and the high-side analog front end U1, respectively, and the switch signal of the first balancing switch transistor 31 is sent from the microcontroller U3; the first balancing resistor 32 has one end thereof connected to the first balancing switch transistor 31 and the other end grounded; the second balancing switch transistor 33 also connects to the output ends of the microcontroller U3 and the low-side analog front end U2, and the switch signal of the second balancing switch transistor 33 is sent from the microcontroller U3; the second balancing resistor 34 has one end thereof connected to the second balancing switch transistor 33 and the other end grounded.

When the balancing module 30 of this embodiment is working, firstly, the microcontroller U3 collects the single battery voltage data of the first set of battery cells 11 emitted by the high-side analog front end U1, and the single battery voltage data of the second set of battery cells 12 emitted by the low-side analog front end U2; then, calculating and obtaining the voltage sum of the added-up voltage of the first set of battery cells 11 and the voltage sum of the added-up voltage of the second set of battery cells 12, respectively, and comparing the voltage sums of the two sets of battery cells; finally, when the voltage sum of the first set of battery cells 11 is greater than the voltage sum of the second set of battery cells 12, the microcontroller U3 judges and controls corresponding first balancing switch transistor 31 to turn on (i.e. sending switch signals), the first balancing circuit A then starts to operate; when the voltage sum of the second set of battery cells 12 is greater than the voltage sum of the first set of battery cells 11, the microcontroller U3 judges and controls corresponding second balancing switch transistor 33 to turn on (i.e. sending switch signals), the second balancing circuit B then starts to operate. In this way, the voltage difference between the two sets of battery cells managed respectively by the high-side analog front end U1 and the low-side analog front end U2 is reduced.

Of course, it is not that when the sum of the voltages of the first set of battery cells 11 must be equal to the sum of the voltages of the second set of battery cells 12, the balancing module 30 does not work. Those skilled in the art can also set a preset value in advance. When the voltage difference between the two voltage sums exceeds the preset value, the microcontroller U3 will control the corresponding balancing circuit to turn on, otherwise the microcontroller U3 can always control the corresponding balancing circuit to close. For example, the microcontroller U3 controls the corresponding balancing circuit (A or B) to start when the voltage difference between the voltage sum of the first set of battery cells 11 and the voltage sum of the second set of battery cells 12 is greater than 100 mv; the microcontroller U3 controls the corresponding balancing circuit (A or B) to turn off when the voltage difference between the voltage sum of the first set of battery cells 11 and the voltage sum of the second set of battery cells 12 is less than 20 mv.

In summary, the voltage equalization system of the present invention is provided with a balancing module 30 at the back end of the low-side analog front end U2 or the high-side analog front end U1, so that the balancing module 30 can be used to balance the voltages of the first set of battery cells 11 and the second set of battery cells 12 according to actual situation, so as to shorten the voltage difference between the two sets of battery cells.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. A voltage balancing system for voltage balancing controlling of battery cells, the battery cells comprising at least a first set of battery cells and a second set of battery cells connected in series, the system comprising:
   a high-side analog front end connected to the first set of battery cells,
   a low-side analog front end connected to the second set of battery cells, the high-side analog front end being not cascaded with the low-side analog front end,
   a microcontroller communicating with the high-side analog front end and the low-side analog front end,
   a communication isolating module connected between the high-side analog front end and the microcontroller, and
   a balancing module, the balancing module configured to balance voltages output by the low-side analog front end and the high-side analog front end, the balancing module comprising a first balancing circuit connected between the high-side analog front end and the microcontroller and a second balancing circuit connected between the low-side analog front end and the microcontroller;

wherein the voltage balancing system defines the voltage output by the high-side analog front end as a first voltage, and defines the voltage output by the low-side analog front end as a second voltage, and wherein the balancing module connects to the microcontroller and consists of a balancing switch transistor and a balancing resistor when a voltage difference between the first voltage and the second voltage is a non-constant value;

wherein the first balancing circuit consists of a first balancing switch transistor and a first balancing resistor connecting with the first balancing switch transistor, and the second balancing circuit consists of a second balancing switch transistor and a second balancing resistor connecting with the second balancing switch transistor;

wherein the first balancing switch transistor is also respectively connected to an output end of the microcontroller and the high-side analog front end, and a switch signal of the first balancing switch transistor is sent by the microcontroller; and wherein the second balancing switch transistor is also respectively connected to an output end of the microcontroller and the low-side analog front end, and a switch signal of the second balancing switch transistor is sent by the microcontroller;

wherein the microcontroller collects and compares sums of voltage output by the first set of battery cells and the second set of battery cells, respectively, wherein when a sum of voltage of the first set of battery cells is greater than that of the second set of battery cells, the microcontroller turns on the first balancing switch transistor to the first balancing circuit; when a sum of voltage of the second set of battery cells is greater than that of the first set of battery cells, the microcontroller turns on the second balancing switch transistor to start the second balancing circuit.

2. The voltage balancing system of claim 1, wherein the microcontroller turns on the corresponding balancing circuit when voltage difference between the sum of voltage of the first set of battery cells and that of the second set of battery cells is greater than 100 mv and shuts down the corresponding balancing circuit when the voltage difference between the sum of voltage of the first set of battery cells and that of the second set of battery cells is less than 20 mv.

3. The voltage balancing system of claim 1, further comprising a low dropout regulator connected between the battery cells and the microcontroller.

\* \* \* \* \*